(12) United States Patent
Soules et al.

(10) Patent No.: US 8,055,845 B2
(45) Date of Patent: Nov. 8, 2011

(54) METHOD OF COOPERATIVE CACHING FOR DISTRIBUTED STORAGE SYSTEM

(75) Inventors: Craig Soules, Pittsburgh, PA (US); Arif Merchant, Los Altos, CA (US); Alistair C. Veitch, Mountain View, CA (US); Yasushi Saito, Mountain View, CA (US); John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1655 days.

(21) Appl. No.: 11/051,435

(22) Filed: Feb. 3, 2005

(65) Prior Publication Data

US 2006/0174063 A1    Aug. 3, 2006

(51) Int. Cl.
| | |
|---|---|
| G06F 12/00 | (2006.01) |
| G06F 13/00 | (2006.01) |
| G06F 13/28 | (2006.01) |
| G06F 15/173 | (2006.01) |
| G06F 9/46 | (2006.01) |

(52) U.S. Cl. ........ 711/118; 711/148; 709/223; 709/224; 709/226; 718/105

(58) Field of Classification Search ................... 711/118, 711/148; 709/223, 224, 226; 718/105
See application file for complete search history.

(56) References Cited

U.S. PATENT DOCUMENTS

| | | | | | |
|---|---|---|---|---|---|
| 5,544,318 | A | * | 8/1996 | Schmitz et al. | ............... 709/207 |
| 5,740,465 | A | * | 4/1998 | Matsunami et al. | ............... 710/5 |
| 6,415,372 | B1 | * | 7/2002 | Zakai et al. | .................... 711/165 |
| 6,418,510 | B1 | * | 7/2002 | Lamberts | ....................... 711/113 |
| 2002/0087783 | A1 | * | 7/2002 | Leonhardt et al. | ............ 711/111 |
| 2002/0133537 | A1 | * | 9/2002 | Lau et al. | ...................... 709/203 |
| 2002/0184403 | A1 | * | 12/2002 | Dahlin et al. | ................. 709/316 |
| 2005/0044229 | A1 | * | 2/2005 | Brown et al. | ................. 709/226 |

OTHER PUBLICATIONS

Pei Cao, Sandy Irani; Cost-Aware WWW Proxy Caching Algorithms, USENIX Symposium on Internet Technologies and Systems; Dec. 1997.*
Michael Rabinovich, Jeff Chase, Syam Gadde; Not All Hits Are Created Equal: Cooperative Proxy Caching Over a Wide-Area Network, 1998.*
Hyde, Randall "Write Great Code" Pub. data: Nov. 2004 Publisher: No Starch, Chapter 11 section 11.1: The memory . Hierarchy and section 11.2: How the Memory Hierarchy Operates.*
Thomas E. Anderson et al., Serverless Network File Systems, ACM, Inc., New York, NY, 1995.
Toni Cortes et al., Design Issues of a Cooperative Cache with no Coherence Problems, 1997.
Michael D. Dahlin et al., Cooperative Caching: Using Remote Client Memory to Improve File System Performance, 1994.
Svend Frølund et al., FAB: enterprise storage systems on a shoestring, 2003.
Gregory R. Ganger et al., Self-* Storage: Brick-based storage with automated administration, Aug. 2003.
David Karger et al., Consistent Hashing and Random Trees: Distributed Cashing Protocols for Relieving Hot Spots on the World Wide Web, 1997.

(Continued)

*Primary Examiner* — Michael Alsip

(57) ABSTRACT

An embodiment of a method of cooperative caching for a distributed storage system begins with a step of requesting data from storage devices which hold the data. The method continues with a step of receiving any cached blocks and expected response times for providing non-cached blocks from the storage devices. The method concludes with a step of requesting a sufficient number of the non-cached blocks from one or more particular storage devices which provides an expectation of optimal performance.

37 Claims, 2 Drawing Sheets

OTHER PUBLICATIONS

Nimrod Megiddo et al., ARC: A Self-Tuning, Low Overhead Replacement Cache, Proceedings of FAST '03: 2nd USENIX Conference on File and Storage Technologies, pp. 115-130, The USENIX Association, Berkeley, CA, Mar. 31, 2003.

Anoop Ninan et al., Scalable Consistency Maintenance in Content Distribution Networks Using Cooperative Leases, 2003.

Pablo Rodriguez et al., Parallel-Access for Mirror Sites in the Internet, 2000.

Pablo Rodriguez et al., Web Caching Architectures: Hierarchial and Distributed Cashing, Jan. 18, 1999.

Antony Rowstron et al., Storage management and caching in PAST, a large-scale persistent peer-to-peer storage utility, SOSP-18, ACM Press, New York, NY, 2001.

Prasenjit Sarkar et al., Efficient Cooperative Caching using Hints, 1996.

Markus Sinnwell et al., A Cost-Model-Based Online Method for Distributed Caching, 1997.

Ion Stoica et al Chord: A Scalable Peer-To-Peer Lookup Service for Internet Applications, 2001.

Mohammed Javeed Zaki, et al., Customized Dynamic Load Balancing for a Network of Workstations, Dec. 1995.

\* cited by examiner

METHOD OF COOPERATIVE CACHING FOR DISTRIBUTED STORAGE SYSTEM

RELATED APPLICATIONS

This application is related to U.S. Application Ser. No. 11/051,436, file on Feb. 3, 2005, the contents of which is hereby incorporated by reference.

FIELD OF THE INVENTION

The present invention relates to the field of data storage. More particularly, the present invention relates to the field of data storage where data is stored in a distributed storage system.

BACKGROUND OF THE INVENTION

A critical component of computer systems is data storage. Data storage can be divided conceptually into an individual user's data storage, which is attached directly to the individual's computer, and network based data storage typically intended for multiple users.

One type of network based storage device is a disk array. The disk array includes a controller coupled to an array of disks. Typically, components (e.g., the controller and the disks) of the disk array are hot swappable, which allows the components to be replaced without turning off the disk array.

As an alternative to the disk array, researchers have been exploring data storage within a distributed storage system which includes an array of independent storage devices coupled together by a network. Each of the independent storage devices includes a processor and two or more levels of data storage, such as main memory, FLASH memory, solid-state memory, magnetic disk drives (which may be high-speed, low capacity or high-capacity, low speed, or some combination), tape drives, and optical drives. Similar device types may also be used as different storage levels if they are configured or used to provide differentiated behaviors at the different storage levels. Typically, one level of data storage is used as a cache for the other; such caching can be inclusive or exclusive, or even a mixture. An advantage of the array of independent storage devices is lower cost. The lower cost can result from mass production of the independent storage devices as commodity devices and from elimination of hot swappable features of the disk array. Another advantage is better scalability. The user can buy a few devices initially and add more devices as demand grows.

If nodes of a distributed storage system have storage hierarchies that include a faster storage level and slower storage level, access latency from the slower storage level can cause a significant delay when a client reads data. If the faster storage levels of the nodes of the distributed storage system could be used to cooperatively cache data, the overall access latency could be improved.

Many distributed storage systems such as GMS, N-chance, or hint-based variants use distributed caching schemes. These distributed caching schemes employ a centralized manager to prevent duplicate cache entries and to manage request routing. Web proxy caching and web mirroring schemes use a static assignment of clients to proxies/mirrors and rely on users to determine which server is least loaded. Multiprocessor machines use broadcast mechanisms between the processors to prevent duplicate cache entries. All of these techniques are trying to avoid network latencies or request processing. None of these techniques address the problem of access latency from a slower storage level of a storage hierarchy.

What is needed is a method of cooperative caching for a distributed storage system which addresses the problem of access latency from a slower storage level of a storage hierarchy.

SUMMARY OF THE INVENTION

The present invention comprises a method of cooperative caching for a distributed storage system. According to an embodiment, the method begins with a step of requesting data from caches of storage devices which hold the data. The method continues with a step of receiving any cached blocks and expected response times for providing non-cached blocks from the storage devices. The method concludes with a step of requesting a sufficient number of the non-cached blocks from one or more particular storage devices which provide an expectation of optimal performance.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

Figure 1:
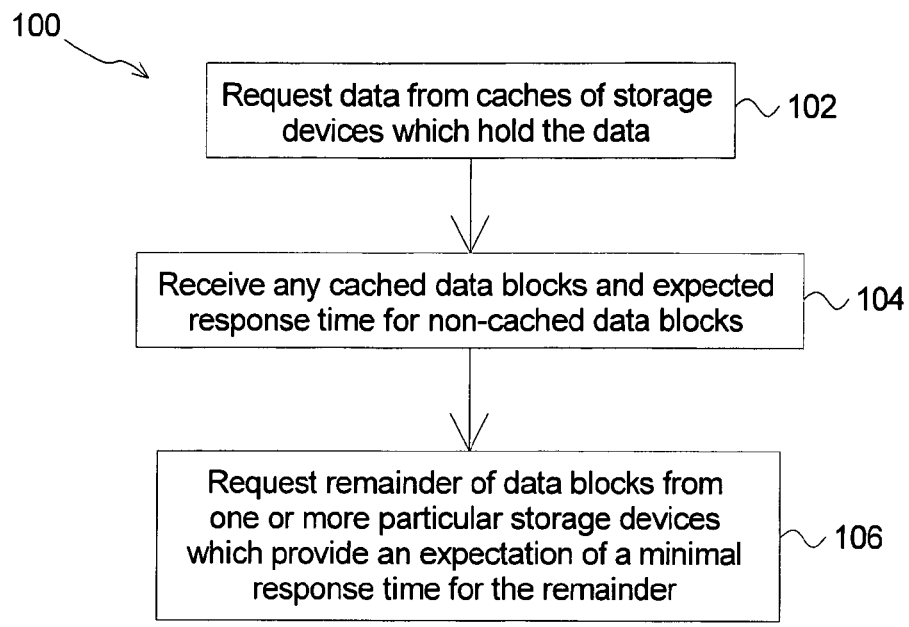
FIG. 1 illustrates an embodiment of a method of cooperative caching for a distributed storage system of the present invention as a flow chart.

The present invention comprises a method of cooperative caching for a distributed storage system. An embodiment of the method of cooperative caching for the distributed storage system of the present invention is illustrated as a flow chart in FIG. 1. The method 100 begins with a first step 102 of requesting data from caches of storage devices which hold the data.

Figure 2:
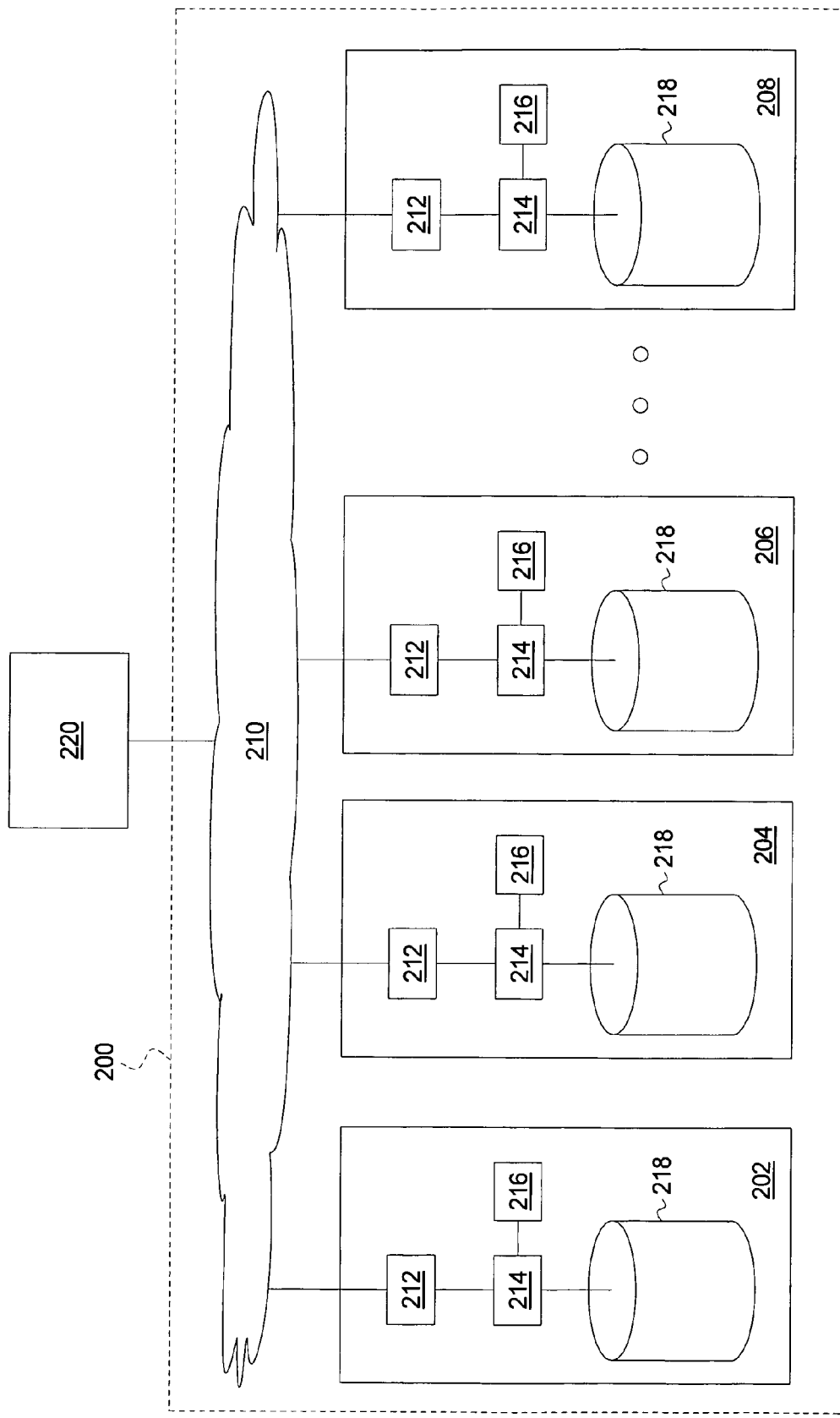
FIG. 2 schematically illustrates a distributed storage system which employs an embodiment of a method of cooperative caching of the present invention.

An embodiment of a distributed storage system which employs the method 100 of the present invention is illustrated schematically in FIG. 2. The distributed storage system 200 comprises first through nth storage devices, 202 . . . 208, which are coupled together by a network 210. Each of the first through nth storage devices, 202 . . . 208, comprises a network interface 212, a processor 214, memory 216, and storage media 218, which are coupled together. Preferably, the memory 216 comprises VRAM (volatile random access memory) used for read caching and NVRAM (non-volatile random access memory) used for write caching. Alternatively, the memory 216 comprises another memory configuration. Preferably, the storage media 218 within each of the first through nth storage devices, 202 . . . 208, comprises one or more disks. Alternatively, the storage media 218 within one or more of the first through nth storage devices, 202 . . . 208, comprises some other storage media such as a tape.

Other embodiments of distributed storage systems which may employ the method 100 of cooperative caching of the present invention include web servers, database systems, storage systems using RAM and extended FLASH memories, distributed tape, multi-tier storage systems, parallel file servers, and other distributed storage systems that include two or more levels of storage (e.g., a memory level and a disk level, or a disk level and a tape level) in which a faster storage level performs caching.

In an invocation of a method of cooperative caching of the present invention, a client 220, which is coupled to the network 210, contacts one of the storage devices. Alternatively, the client 220 couples to the storage device by way of another network (not shown). This storage device then acts as a coordinator of the method. Alternatively, the client 220 or another computer coupled to one or more of the storage devices 220 acts as the coordinator.

In an embodiment, the data comprises replicated data. Here, each of the storage devices within a replica set holds a copy of the replicated data. For example, three storage devices may hold the replicated data. According to this example, the data comprises three replicas. Alternatively, the storage devices holding the replicated data may comprise more or less storage devices.

In another embodiment, the data comprises a stripe of erasure coded data. The stripe of erasure coded data comprises data blocks and parity blocks. For example, the stripe of erasure coded data may comprise three data blocks and two parity blocks. In this example, five storage devices hold the stripe of erasure coded data. To reconstruct the stripe of erasure coded data, a client must receive any three blocks selected from the five storage devices. If the client receives the three data blocks, no further action is required to use the data. If the client receives one or two of the parity blocks in lieu of one or two of the data blocks, the client decodes the data from data and parity blocks. For multiple stripes of erasure coding, the client requests appropriate data blocks and parity blocks from the storage devices that hold the data and parity blocks of the multiple stripes.

In yet another embodiment, the data comprises mirrored data that is located at mirror sites on a WAN (wide area network) such as the Internet.

The method 100 (FIG. 1) continues with a second step 104 of receiving any cached blocks and expected response times for receiving non-cached blocks from the storage devices. In an embodiment, the cached blocks are held in the memory 216 (i.e., the caches) by responding storage devices. In an embodiment, the expected response time comprises a measure of the load on the responding storage device. In an embodiment, the non-cached blocks comprise blocks held in the storage media 218.

According to some instances of the method 100, the cached blocks received in the second step 104 will provide all of the requested data. According to such an instance, the method 100 will not proceed to a subsequent step.

In an embodiment, the load on a storage device comprises a number of outstanding disk read requests. In another embodiment, the load on a storage device comprises a weighted sum of a number of outstanding memory read requests and a number of outstanding disk read requests. In another embodiment, the load on a storage device comprises a weighted sum of a number of outstanding memory read or write requests, a number of outstanding transfers from a write memory to disk, and a number of outstanding disk read requests. In another embodiment, the load on a storage device further comprises a weighted number of outstanding timestamp requests. For example, the load on a storage device may be found from:

$$\text{load} = 0.3 \cdot T + C + 5 \cdot D + 10 \cdot V$$

where T is the number of outstanding timestamp requests, C is the number of outstanding memory read or write requests, D is the number of outstanding disk read requests, and V is the number of outstanding transfers from a write memory to disk.

In an embodiment, a cumulative load is determined by periodically saving an instantaneous load and then summing over a number of time periods. For example, each of the first though nth storage devices, 202 . . . 208, may measure and save its instantaneous load every 0.2 sec. and sum the saved instantaneous loads every 5 sec. In an embodiment, the load used to approximate an expected response time comprises the cumulative load. In another embodiment, the load used to approximate an expected response time comprises the instantaneous load.

According to an embodiment, the memory comprises multiple cache levels. Here, the second step 104 may receive and request cached blocks from successively slower cache levels until the multiple cache levels have been queried and in a last query may also request and receive the response time for receiving the non-cached blocks. Alternatively, the second step 104 receives the cached data blocks from the fastest cache level and receives the response time for receiving the data blocks from a slower cache level, if the data blocks reside in the slower cache level, or receives the response time for receiving the data from the storage media 218.

The method 100 concludes with a third step 106 of requesting a remainder of the data blocks from one or more particular storage devices which provides an expectation of a minimal response time for receiving the data. In an embodiment, the expectation of the minimal response time is based upon the response times provided in the second step 104. In another embodiment, the expectation of the minimal response time is based upon a combination of the response times provided in the second step 104 and historical correction factors. The historical correction factors may be kept by the coordinator or they may be provided by each of the storage nodes that provides an expected response time.

In embodiments in which the storage devices hold copies of the data (e.g., replicated data or mirrored data), a single storage device with the minimal response time is chosen to provide non-cached data blocks. Alternatively, in embodiments in which the storage devices hold copies of the data, a plurality of the storage devices with low response times may be chosen to provide the data. In this alternative, individual requests are sent to the set of storage devices with the low response times in which each of the storage devices in the set is requested to provide unique data blocks such that the combination of the individuals requests covers the remainder of the data blocks. In this alternative, the range of response times that is considered low may be expanded if the need for the data is of a high priority.

In an embodiment in which the data comprises a stripe of erasure coded data, a minimum number of the storage devices will be chosen to provide the non-cached blocks with the expectation of the minimal response time. For example, if the stripe of erasure coded data comprises three data blocks and two parity blocks and only one cached block is received in the second step 104, two of the remaining four storage devices that hold the stripe of erasure coded data are requested to provide the non-cached blocks in the third step 106.

In an alternative embodiment, the first step 102 staggers individual requests over time. For example, the first step 102 may initially request blocks from storage devices having a better performance history before requesting the blocks from other storage devices. In this embodiment, if the desired data is returned before all the requests have been sent, remaining requests need not be sent. In another alternative embodiment, any outstanding requests are cancelled once requested data has been received. This alternative embodiment may be combined with the alternative of staggering individual requests over time.

In an alternative embodiment, the second step 104 provides any cached blocks and expected response performances for providing the non-cached blocks from the storage devices. In embodiments, the expected response performances comprise expected response times, expected response costs, or a combinations of expected response time and expected response cost. The expected response cost, for example, may be determined from a product of a cost per tape mount and a number of required tape mounts; or the expected response cost may be determined from a product of unit energy cost and energy expended in performing data retrieval. Or, for example, the expected response cost may be determined from a product of unit load cost and a load.

In this alternative embodiment, the third step 106 comprises requesting a remainder of the data blocks from one or more particular storage devices which provides an expectation of optimal performance. In an embodiment, the expectation of optimal performance comprises an expectation of a minimal response time for receiving a remainder of the data. In another embodiment, the expectation of optimal performance comprises an expectation of minimal response cost for providing a remainder of the data. In yet another embodiment, the expectation of optimal performance comprises an optimal combination of an expectation of response cost for providing a remainder of the data and an expectation of response time from receiving the remainder of the data. The optimal combination of the expectations of response cost and response time may be determined by a weighting function. For example, a combination of expected response time RespTime(i) and expected response cost RespCost(i) for an ith storage node may be given by Combination$Resp$Time & CostNode$(i)$=$J$*$Resp$Time$(i)$+$K$*$Resp$Cost$(i)$ where J and K are weighting factors having values between and including 0 and 1, and the ith storage node is one of a set of first through nth storage nodes. The ith storage node may provide the expected response time RespTime(i) and the expected response cost RespCost(i) or the ith storage node may provide the combination of the expected response time RespTime(i) and the expected response cost RespCost(i). A subset of the first through nth storage nodes for retrieving the remainder of the data which provide the optimal combination of expectations of response cost and response time may be determined using any of a number of algorithms for performing the optimization. For example, the algorithm may pick the particular node having the lowest combination of the expected response time RespTime(i) and the expected response cost RespCost(i). Or, for example, the algorithm may pick the nodes having combinations of the expected response time RespTime(i) and the expected response cost RespCost(i) that fall within a lowest percentage (e.g., 10%) of a range of combinations of the expected response time RespTime(i) and the expected response cost RespCost(i).

Each of the storage devices which holds the data employs a local caching policy. According to an embodiment, the local caching policy comprises an LRU (least recently used) caching policy. According to other embodiments, the local caching policy comprises a least frequently used caching policy, a random caching policy, a FIFO (first-in-first-out) caching policy, an ARC (adaptive replacement caching) policy, or another caching policy. The local caching policy determines which data is kept in the cache-memory.

Figure 3:
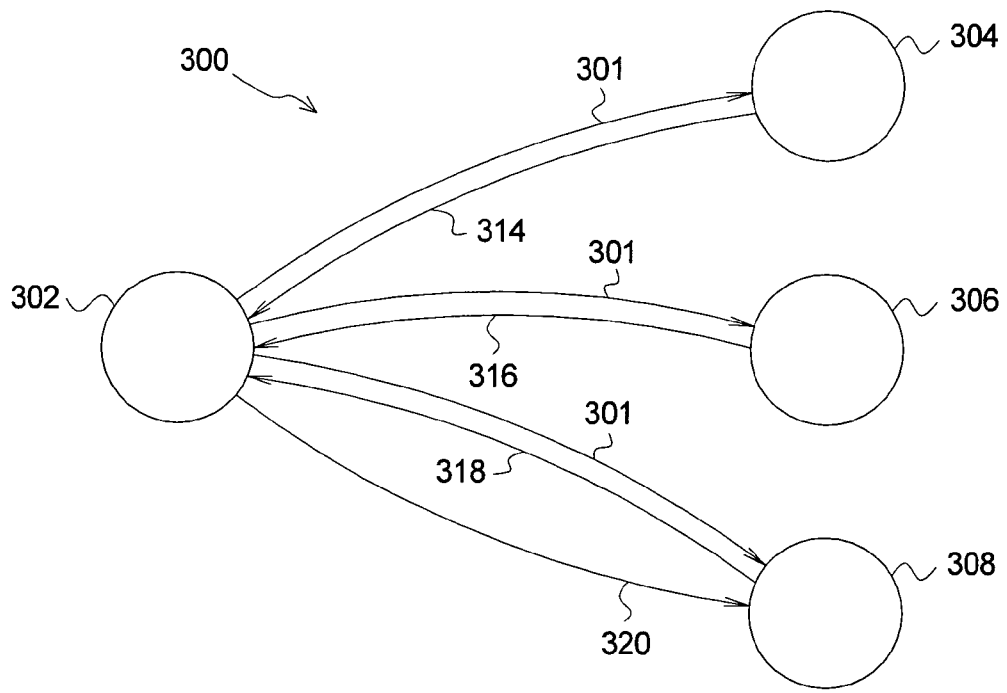
FIG. 3 schematically illustrates an exemplary embodiment of a method of cooperative caching for data replicated across a replica set of three storage devices.

An exemplary embodiment of a method of cooperative caching of the present invention is illustrated schematically in FIG. 3. In a first step 301, a client (e.g., a coordinator) 302 issues a cache read request for first through seventh data blocks of data from a set of first through third storage devices, 304 . . . 308. For example, the first through seventh data blocks may be replicated data and the first through third storage devices may be a replica set. Or, for example, the first through seventh data blocks may be mirrored data and the first through third storage devices may be mirror sites on a WAN such as the Internet. Each of the first through third storage devices, 304 . . . 308, holds the first through seventh data blocks in storage and may also hold one or more of the first through seventh data blocks in memory (i.e. a cache).

In a second step, the client 302 receives first through third responses, 314 . . . 318, from the first through third storage devices, 304 . . . 308, respectively. The first response 314 provides the first and second data blocks and a load of four. The first and second data blocks were provided from the memory of the first storage device 304. The load of four indicates a relative expected response time for the first storage device 304. The second response 316 provides the third and fourth data blocks and a load of three. The third response 318 provides the fifth data block and a load of one.

In a third step 320, the client 302 requests the sixth and seventh data blocks from the third storage device 308 since the third storage device 308 provided the lowest load (i.e., the lowest relative expected response time). In response, the third storage device 308 places the sixth and seventh data blocks in the memory of the third storage device 308 and provides the sixth and seventh data blocks to the client 302.

The first through third storage devices, 304 . . . 308, maintain the first through seventh data blocks in the memory according to the local caching policy. For example, if the first through third storage devices, 304 . . . 308, employ the LRU caching policy, the first storage device 304 places the first and second data blocks at the end of an eviction queue for the memory of the first storage device 304. Likewise, the second and third storage devices, 306 and 308, place the third and fourth data blocks, and the fifth through seventh data blocks at the end of their respective eviction queues. If the client 302 or another client instantiates the method of cooperative caching of the present invention at a time in the near future (before the LRU eviction policy evicts any of the first through seventh data blocks), the second step will return the first through seventh data blocks from the first through third storage devices, 304 . . . 308, obviating the need to perform the third step 320.

The exemplary embodiment 300 (FIG. 3) demonstrates at least three benefits of the method of cooperative caching of the present invention. First, the method efficiently causes the first through third storage devices, 304 . . . 308, to perform the cooperative caching. It is efficient in that the two requests of the first and third steps in conjunction with the local caching policy combine to perform the cooperative caching. Second, it avoids duplication of data blocks within the caches of multiple storage devices. The act of caching occurs in response to the third step, which requests the remainder of the data blocks from the storage device having the minimal expected response time. Since other storage devices which store the replicated data are not requested to provide the data, the data does not appear in the other caches. Third, it balances the load among the storage devices by only requesting the non-cached data blocks from the storage device having the lowest expected response time. This increases the load on this storage device while not increasing the load on other storage devices. Similar benefits accrue for erasure coded data.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of cooperative caching for a distributed storage system comprising the steps of:
    requesting data from caches of storage devices which hold the data;
    in response to said requesting, receiving any cached blocks of the data and expected response performances for providing any non-cached blocks of the data from the storage devices; and
    requesting a sufficient number of the non-cached blocks from one or more particular storage devices which provide an expectation of optimal performance.

2. The method of claim 1 wherein the expected response performances comprise expected response costs and the expectation of optimal performance comprises an expectation of minimal response cost for providing a remainder of the data.

3. The method of claim 1 wherein the expected response performances comprise combinations of an expected response cost and an expected response time, and the expectation of optimal performance comprises an optimal combination of an expectation of a response cost for providing a remainder of the data and an expectation of a response time for receiving the remainder of the data.

4. The method of claim 1 wherein the expected response performances comprise expected response times and the expectation of optimal performance comprises an expectation of minimal response time for receiving a remainder of the data.

5. A method of cooperative caching for a distributed storage system comprising the steps of:
    requesting data from caches of storage devices which hold the data;
    in response to said requesting, receiving any cached blocks of the data and expected response times for providing non-cached blocks of the data from the storage devices; and
    requesting a sufficient number of the non-cached blocks from one or more particular storage devices which provide a remainder of the data with an expectation of a minimal response time.

6. The method of claim 5 wherein the cached blocks, if any, are held in a cache-level of a storage hierarchy and the non-cached blocks are held a slower-response level of the storage hierarchy.

7. The method of claim 5 wherein the cached blocks, if any, are held in a cache memory and the non-cached blocks are held in a slower-response memory or storage.

8. The method of claim 5 wherein multiple copies of the data exist in the distributed storage system.

9. The method of claim 8 wherein the copies of the data comprise replicated data.

10. The method of claim 8 wherein the copies of the data comprise mirrored data.

11. The method of claim 8 wherein the step of requesting the sufficient number of the non-cached blocks from the one or more particular storage devices which provide the expectation of the minimal response time for receiving the remainder of the copies of the data comprises requesting subsets of the remainder of the data blocks from a set of the storage devices which each provide a low expected response time.

12. The method of claim 5 wherein the data comprises erasure coded data.

13. The method of claim 12 wherein a stripe of the erasure coded data comprises data blocks and parity blocks.

14. The method of claim 5 wherein the step of requesting the sufficient number of the non-cached blocks from the one or more particular storage devices which provide the expectation of the minimal response time for receiving the remainder of the data includes considering available network bandwidth and network latencies between a requestor and the storage devices.

15. The method of claim 5 wherein each expected response time comprises a load on a responding storage device.

16. The method of claim 15 wherein the load comprises a weighted sum of outstanding cache-read requests, outstanding cache-write requests, outstanding disk-read requests, and outstanding disk write requests.

17. The method of claim 5 wherein the expectation of the minimal response time is based upon the expected response times provided by the storage devices.

18. The method of claim 5 wherein the expectation of the minimal response time is based upon a combination of the expected response times provided by the storage devices and historical correction factors.

19. A method of cooperative caching for a distributed storage system comprising the steps of:
    requesting data blocks of replicated data from caches of storage devices which hold the replicated data;
    in response to said requesting, receiving cached data blocks of the replicated data, if any, and an expected response time for providing non-cached data blocks of the replicated data from one or more responding storage devices; and
    requesting a remainder of the data blocks of the replicated data from a particular storage device having a minimal expected response time.

20. The method of claim 19 wherein the expected response time for the responding storage device comprises a load on the responding storage device.

21. The method of claim 20 wherein the load comprises a weighted sum of outstanding cache-read requests, outstanding cache-write requests, outstanding disk-read requests, and outstanding disk write requests.

22. The method of claim 19 wherein the step of receiving the cached data blocks, if any, and the expected response time for providing the non-cached data blocks from at least one of the storage devices comprises:
    receiving first level cached data blocks, if any, from at least one of the storage devices;
    requesting the data blocks less received cached data blocks from a second level cache from the storage devices; and
    receiving the second level cached data blocks, if any, and the expected response time from at least one of the storage devices.

23. The method of claim 19 wherein the step of receiving the cached data blocks, if any, and the expected response time for providing the non-cached data blocks from at least one of the storage devices comprises:
    receiving first level cached data blocks, if any, from at least one of the storage devices;
    requesting the data blocks less received first level cached data blocks from a second level cache from the storage devices;
    receiving the second level cached data blocks, if any, from at least one of the storage devices;

requesting the data blocks less received first and second level cached data blocks from a third level cache from the storage devices; and receiving the third level cached data blocks, if any, and the expected response time from at least one of the storage devices.

24. The method of claim 19 wherein the cached blocks are held in a memory and the memory comprises a hierarchy of a cache memory and a slower memory.

25. The method of claim 24 wherein the expected response time indicates the expected response time for providing the non-cached blocks from the slower memory if the non-cached blocks reside in the slower memory.

26. The method of claim 24 wherein each storage device first looks for cached data blocks in the cache memory and, if needed, then looks for the cached data blocks in the slower memory.

27. The method of claim 19 wherein the responding storage device further comprises storage and wherein the non-cached data blocks reside in the storage.

28. The method of claim 19 wherein the step of requesting the data blocks of the replicated data from the storage devices staggers the requests over time.

29. The method of claim 19 wherein the step of requesting the data blocks of the replicated data from the storage devices first requests the data blocks from the storage devices having a better performance history.

30. The method of claim 19 further comprising the step of canceling any outstanding requests once the data blocks have been received.

31. A method of cooperative caching for a distributed storage system comprising the steps of:
requesting a stripe of erasure coded data from caches of storage devices which hold the erasure coded data, the stripe of erasure coded data comprising data blocks and one or more parity blocks;
if the cache of any of the storage devices holds one of the data blocks or the one or more parity blocks, receiving a cached block from each of a subset of the storage devices in response to said requesting, the cached block comprising a cached data block or a cached parity block held in the memory of a responding storage device;
in response to said requesting, receiving an expected response time for providing a non-cached block from each of remaining storage devices, the non-cached block comprising the data block or the parity block not held in the memory of the responding storage device; and
requesting that each of a minimum number of the remaining storage devices having a minimal expected response time provide the data block or the parity block that it holds in order to receive a minimum number of blocks needed to reconstruct the stripe of erasure coded data.

32. A computer readable media comprising computer code for implementing a method of cooperative caching for a distributed storage system, the method of cooperative caching comprising the steps of:
requesting data from caches of storage devices which hold the data;
in response to said requesting, receiving any cached blocks of the data and expected response times for providing any non-cached blocks of the data from the storage devices; and
requesting a sufficient number of the non-cached blocks from one or more particular storage devices which provide an expectation of optimal performance.

33. A computer readable media comprising computer code for implementing a method of cooperative caching for a distributed storage system, the method of cooperative caching comprising the steps of:
requesting data from caches of storage devices which hold the data;
in response to said requesting, receiving any cached blocks of the data and expected response times for providing non-cached blocks of the data from the storage devices; and
requesting a sufficient number of the non-cached blocks from one or more particular storage devices which provide a remainder of the data with an expectation of a minimal response time.

34. The computer readable media of claim 33 wherein the data comprises replicated data.

35. The computer readable media of claim 33 wherein the data comprises erasure coded data.

36. A computer readable media comprising computer code for implementing a method of cooperative caching for a distributed storage system, the method of cooperative caching comprising the steps of:
requesting data blocks of replicated data from caches of storage devices which hold the replicated data;
in response to said requesting, receiving cached data blocks of the replicated data, if any, and an expected response time for providing non-cached data blocks of the replicated data from one or more responding storage devices; and
requesting a remainder of the data blocks of the replicated data from a particular storage device having a minimal expected response time.

37. A computer readable media comprising computer code for implementing a method of cooperative caching for a distributed storage system, the method of cooperative caching comprising the steps of:
requesting a stripe of erasure coded data from caches of storage devices which hold the erasure coded data, the stripe of erasure coded data comprising data blocks and one or more parity blocks;
if the cache of any of the storage devices holds one of the data blocks or the one or more parity blocks, receiving a cached block from each of a subset of the storage devices in response to said requesting, the cached block comprising a cached data block or a cached parity block held in the memory of a responding storage device;
in response to said requesting, receiving an expected response time for providing a non-cached block from each of remaining storage devices, the non-cached block comprising the data block or the parity block not held in the memory of the responding storage device; and
requesting that each of a minimum number of the remaining storage devices having a minimal expected response time provide the data block or the parity block that it holds in order to receive a minimum number of blocks needed to reconstruct the stripe of erasure coded data.

* * * * *